(12) United States Patent
Chen et al.

(10) Patent No.: US 11,697,590 B2
(45) Date of Patent: Jul. 11, 2023

(54) SOFT CARBON AND METHOD FOR MANUFACTURING THE SAME

(71) Applicant: CPC CORPORATION, Kaohsiung (TW)

(72) Inventors: Yan-Shi Chen, Chiayi (CN); Chia-Lin Chang, Chiayi (CN); Kuei-Sen Chang, Chiayi (CN); Guo-Hsu Lu, Chiayi (CN)

(73) Assignee: CPC CORPORATION, TAIWAN, Kaohsiung (TW)

( * ) Notice: Subject to any disclaimer, the term of this patent is extended or adjusted under 35 U.S.C. 154(b) by 582 days.

(21) Appl. No.: 16/859,766

(22) Filed: Apr. 27, 2020

(65) Prior Publication Data

US 2021/0238039 A1    Aug. 5, 2021

(30) Foreign Application Priority Data

Jan. 31, 2020   (TW) .................................. 109103095

(51) Int. Cl.
| | | |
|---|---|---|
| *C01B 32/05* | (2017.01) | |
| *C10B 53/07* | (2006.01) | |
| *C10B 57/02* | (2006.01) | |

(52) U.S. Cl.
CPC .............. *C01B 32/05* (2017.08); *C10B 53/07* (2013.01); *C10B 57/02* (2013.01)

(58) Field of Classification Search
CPC ..................................................... C01B 32/05
See application file for complete search history.

(56) References Cited

U.S. PATENT DOCUMENTS

| 4,100,265 A | * | 7/1978 | Yoshimura | ................ | C10L 9/08 |
| | | | | | 423/460 |
| 5,900,189 A | * | 5/1999 | Kawano | ................ | C01B 32/205 |
| | | | | | 252/502 |
| 2018/0371323 A1 | * | 12/2018 | Elkasabi | ................ | C10B 53/02 |

* cited by examiner

*Primary Examiner* — Stuart L Hendrickson
(74) *Attorney, Agent, or Firm* — Hamre, Schumann, Mueller & Larson, P.C.

(57) ABSTRACT

A method for making a soft carbon includes providing a coke, and subjecting the coke to a carbonization process. The carbonization process includes a preliminary calcination treatment conducted by calcining the coke at a first temperature ranging from 800° C. to 1000° C. to obtain a pre-calcinated coke, followed by a main calcination treatment conducted by calcining the pre-calcinated coke at a second temperature ranging from 1000° C. to 1200° C., and/or a surface-modifying calcination treatment conducted by calcining the pre-calcinated coke in the presence of a carbonaceous material for modifying surfaces thereof at a third temperature ranging from 1000° C. to 1200° C. A soft carbon made by the method is also disclosed.

8 Claims, 3 Drawing Sheets

SOFT CARBON AND METHOD FOR MANUFACTURING THE SAME

CROSS-REFERENCE TO RELATED APPLICATION

This application claims priority of Taiwanese Invention Patent Application No. 109103095, filed on Jan. 31, 2020.

FIELD

This disclosure relates to an amorphous carbonaceous material and a method for manufacturing the same, and more particularly to a soft carbon and a method for manufacturing the same.

BACKGROUND

Carbon-containing materials are often used to make anodes of lithium-ion batteries. The performance of the lithium-ion batteries greatly depends on the properties of the carbon-containing materials.

Taiwanese Patent Publication No. I603528 discloses a precursor composition for forming an amorphous carbon-containing material. The precursor composition includes, based on a total weight of the precursor composition, 84 wt % to 92.1 wt. of carbon element, 6 wt % to 10.3 wt % of hydrogen element, 0.59 wt % to 2 wt % of nitrogen element, and 0 wt % to 6 wt % of sulfur element.

The precursor composition has a weight average molecular weight ranging from 149 to 900, and a molecular weight distribution index ranging from 1.33 to 6.87. In addition, the precursor composition includes, based on a total weight of the precursor composition, 0 wt % to 0.0478 wt % of an ash component, 15 wt % to 82 wt % of an aromatic hydrocarbon component, 12 wt % to 51 wt % of a saturated alkane component, and 6 wt % to 34 wt % of a cycloalkane component. The amorphous carbon-containing material can be made by sequentially subjecting the precursor composition to a coking step, a carbonization step, a grinding step, and a sizing step. The coking step is performed under a heating temperature ranging from 400° C. to 600° C. for a time period ranging from 1 hour to 16 hours. The carbonization step is performed under a temperature ranging from 1000° C. to 1200° C. for a time period of over 4 hours. A lithium-ion battery having an anode made from the resultant amorphous carbon-containing material may have a reduced percentage of irreversible capacity loss.

Despite the aforesaid, researchers in this field still endeavor to develop a carbon-containing material for making batteries with improved performance.

SUMMARY

Therefore, an object of the disclosure is to provide a soft carbon and a method for manufacturing the same that can alleviate at least one of the drawbacks of the prior art and make batteries with improved performance.

According to the disclosure, the method for manufacturing the soft carbon includes the steps of providing a coke; and subjecting the coke to a carbonization process to obtain the soft carbon.

The carbonization process includes a preliminary calcination treatment, followed by one of a main calcination treatment, a surface-modifying calcination treatment, and the combination thereof. The preliminary calcination treatment is conducted by calcining the coke at a first temperature within a range of 800° C. to 1000° C. to obtain a pre-calcinated coke. The main calcination treatment is conducted by calcining the pre-calcinated coke at a second temperature that is higher than the first temperature and within a range of 1000° C. to 1200° C. The surface-modifying calcination treatment is conducted by calcining the pre-calcinated coke in the presence of a carbonaceous material for modifying surfaces of the pre-calcinated coke, and at a third temperature that is higher than the first temperature and within the range of 1000° C. to 1200° C.

This disclosure also provides the soft carbon, which is prepared by the abovementioned method.

BRIEF DESCRIPTIONS OF THE DRAWINGS

Other features and advantages of the disclosure will become apparent in the following detailed description of the embodiment with reference to the accompanying drawings, in which.

DETAILED DESCRIPTION

Figure 1:
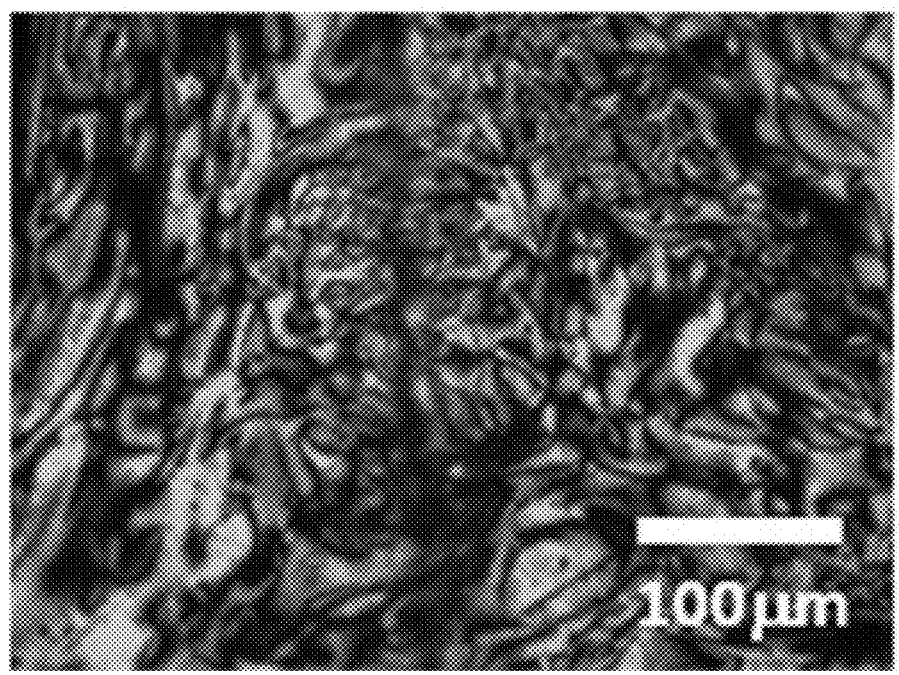
FIG. 1 is a polarizing microscope image of a coke used to prepare a soft carbon of Example 1, in which black regions are crystals in a same phase (i.e., an isotropic phase), and grey regions are crystals having a mesophase structure.

Unless defined otherwise, all technical and scientific terms used herein have the meaning commonly understood by a person skilled in the art to which the present disclosure belongs.

One skilled in the art will recognize many methods and materials similar or equivalent to those described herein, which could be used in the practice of the present disclosure. Indeed, the present disclosure is in no way limited to the methods and materials described.

According to the disclosure, a method for manufacturing a soft carbon includes the steps of:

a) providing a coke; and b) subjecting the coke to a carbonization process to obtain the soft carbon.

The coke suitable for use in the disclosure is not particularly limited, and may be obtained by any process well-known to those skilled in the art.

As used herein, the term "coke", as generally used in the art, refers broadly to any high molecular weight carbonaceous solid residues made by carbonizing liquid or liquefiable hydrocarbons, particularly those of petroleum origin, whether obtained by the direct coking of the hydrocarbon or produced during cracking of oils by thermal methods. The precursor composition for forming an amorphous carbon-containing material as disclosed in TW I603528 may serve as a coke as mentioned herein and be used in this disclosure. In certain embodiments, at least parts of the coke have a mesophase structure (i.e., mesophase domain). For example, the coke may have a mesophase domain size ranging from 1 μm to 200 μm.

As used herein, the term "mesophase" refers to a material being in an intermediate state and a portion thereof exhibiting optical anisotropy when examined on a polarizing microscope. That is, such material in the mesophase exhibits both anisotropic and isotropic properties.

In an exemplary embodiment, the coke has a mesophase domain size that ranges from 50 µm to 200 µm, and is prepared by the process as described below, but is not limited to. Specifically, a heavy oil is delivered into a reaction tank, where the heavy oil is heated from room temperature to a temperature ranging from 400° C. to 600° C. at a rate ranging from 5° C./min to 10° C./min, and then maintained at the temperature for 1 hour to 16 hours under a pressure ranging from 0.2 MPa to 4 MPa, so that the heavy oil is subjected to pyrolysis and polycondensation reactions, thereby obtaining the coke.

In another exemplary embodiment, the coke has a mesophase domain size that ranges from 1 µm to 30 µm, which is prepared by the process as described below, but is not limited to. Specifically, a heavy oil is delivered into a heating furnace, and is heated at a temperature ranging from 480° C. to 520° C. under a pressure ranging from 0.18 MPa to 0.22 MPa for 0.01 hour to 0.02 hour. During the heating process, water (in an amount of 0.8 wt % to 1.2 wt % of a total weight of the heavy oil) is also delivered into the heating furnace to generate water vapor thereinside. Then, the heated heavy oil is delivered, through a conveyor pipe in the presence of the water vapor, from the heating furnace to a coke chamber at a flow rate ranging from 0.02 $m^3$/s to 0.03 $m^3$/s. Thereafter, the heavy oil in the coke chamber is subjected to pyrolysis and polycondensation reactions at a reaction temperature ranging from 470° C. to 520° C. and under a pressure ranging from 0.18 MPa to 0.22 MPa for 16 hours to 24 hours so as to obtain the coke. It should be noted that, during the process of delivering the heated heavy oil into the coke chamber, a flow stress, such as the flow of water vapor and/or the flow of the heated heavy oil delivered into the coke chamber at a high flow rate, may be generated. When the heated heavy oil is subjected to pyrolysis and polycondensation reactions under the flow stress, the coke thus formed may have a relatively small mesophase domain size (i.e., 1 µm to 30 µm) and a flow structure.

The carbonization process in step b) includes a preliminary calcination treatment, followed by one of a main calcination treatment, a surface-modifying calcination treatment, and the combination thereof. That is, one or both of the main calcination treatment and the surface-modifying calcination treatment may be conducted after the preliminary calcination treatment.

In certain embodiments, the carbonization process further includes, after the preliminary calcination treatment, subjecting the pre-calcinated coke to a grinding and sizing treatment, which may allow the soft carbon to have a uniform grain size and shape.

In an exemplary embodiment, the carbonization process includes the preliminary calcination treatment, the grinding and sizing treatment, the main calcination treatment, and the surface-modifying calcination treatment conducted in such order.

The preliminary calcination treatment is conducted by calcining the coke at a first temperature within a range of 800° C. to 1000° C. to obtain a pre-calcinated coke. In certain embodiments, the preliminary calcination treatment is conducted at the first temperature for 4 hours to 16 hours. During the preliminary calcination treatment, the coke undergoes one of a polycondensation reaction, a dehydrogenation reaction, a pyrolysis reaction, and combinations thereof, such that carbon atoms of the pre-calcinated coke start to undergo an $sp^2$ hybridization.

The main calcination treatment is conducted by calcining the pre-calcinated coke at a second temperature that is higher than the first temperature and within a range of 1000° C. to 1200° C. In certain embodiments, the main calcination treatment is conducted at the second temperature for 4 hours to 20 hours. During the main calcination treatment, the pre-calcinated coke further undergoes the polycondensation reaction, the dehydrogenation reaction, the pyrolysis reaction, or combinations thereof, such that carbon atoms in the pre-calcinated coke may be rearranged to form the $sp^2$ hybridization.

The surface-modifying calcination treatment is conducted by calcining the pre-calcinated coke in the presence of a carbonaceous material for modifying surfaces of the pre-calcinated coke at a third temperature that is higher than the first temperature and within the range of 1000° C. to 1200° C. In certain embodiments, the surface-modifying calcination treatment is conducted at the third temperature for 4 hours to 20 hours. It is noted that micropores might be formed on surfaces of the pre-calcinated coke (e.g., after the grinding and sizing treatment), which may increase a specific surface area of the soft carbon to be made. An anode of a battery made from the soft carbon that has increased specific surface area is prone to damage caused by electrolytic solutions, which may impair performance of the battery. Therefore, during the surface-modifying calcination treatment, the micropores on the surfaces of the pre-calcinated coke may be covered and coated with the carbonaceous material, so that the specific surface area of the soft carbon thus obtained can be effectively reduced.

The carbonaceous material suitable for use in this disclosure may include, but is not limited to, a pitch, a polymer, and the combination thereof. An example of the pitch may be an isotropic pitch, but is not limited thereto. Examples of the polymer may include, but are not limited to, poly (vinylalcohol), poly(allylamine), and the combination thereof. In an exemplary embodiment, the carbonaceous material is a pitch having a softening point not lower than 100° C. (i.e., with a relatively high thermostability), so as to reduce an amount of smoke produced during the surface-modifying calcination treatment.

The present disclosure also provides the soft carbon made by the method as mentioned above. The soft carbon may be utilized to make an anode of a battery having improved performance.

In an exemplary embodiment, the soft carbon has a grain size ranging from 2 nm to 5 nm when the coke used in step a) has a mesophase domain size ranging from 50 µm to 200 µm. The battery having the anode made from such soft carbon may exhibit an improved fast charging ability and a reduced percentage of irreversible capacity loss.

In another exemplary embodiment, the soft carbon has a grain size of greater than 1 nm and less than 1.5 nm when the coke used in step a) has a mesophase domain size ranging from 1 µm to 30 µm. The battery having the anode made from such soft carbon may exhibit a longer cycle life.

The embodiment of the disclosure will now be explained in more detail hereinbelow by way of the following examples and comparative examples. However, it should be understood that the following examples are solely intended for the purpose of illustration and should not be construed as limiting the disclosure in practice.

Example 1

Preparation of Soft Carbon

A soft carbon of Example 1 was prepared by the following steps (a) and (b).

In step (a), a coke was provided, in which a heavy oil was delivered into a reaction tank, where the heavy oil was heated from room temperature to 500° C. at a rate of 10° C./min, and then maintained at 500° C. for 4 hours under a pressure of 1 MPa, so that the heavy oil was subjected to pyrolysis and polycondensation reactions, thereby obtaining the coke. Thereafter, the reaction tank was cooled in air to room temperature, and then the coke was collected and then observed using a polarizing microscope (Manufacturer: Nikon; Model: Eclipse LV100POL). Referring to FIG. 1, the coke has a mesophase domain size within a range of 50 μm to 200 μm.

In step b), the coke obtained in step (a) was subjected to the preliminary calcination treatment, in which the coke was heated from room temperature to the first temperature of 850° C. at a rate of 10° C./min and then calcinated at 850° C. for 4 hours. The resultant pre-calcinated coke was ground and then sized using a classifying cyclone (Manufacturer: NPK Construction Equipment, Inc.; Model: LJ-3/MDS3). The pre-calcinated coke having an average grain size ($D_{50}$) ranging from 12 μm to 15 μm was collected and then subjected to subsequent calcination treatments, including the main calcination treatment followed by the surface-modifying calcination treatment so as to obtain the soft carbon of Example 1. In the main calcination treatment, the pre-calcinated coke was heated from room temperature to the second temperature of 1100° C. at a rate of 10° C./min and then calcinated at 1100° C. for 4 hours. After cooling to 30° C., in the surface-modifying calcination treatment, the pre-calcinated coke from the main calcination treatment was heated again to the third temperature of 1100° C. at a rate of 1.5° C./min and then calcinated at the third temperature for 5 hours in the presence of a pitch having a softening point of 250° C.

Preparation of Anode

The soft carbon obtained above was used to prepare an anode of a battery. To be specific, the soft carbon of Example 1 was granulated using a wide inlet granulator (Manufacturer: Pulian; Model: JW-350-SP), followed by sieving with a sieve screen having a screen size of 38 μm to obtain an anode material. Then, 9.1 g of the anode material, 0.5 g of polyvinylidene difluoride (Manufacturer: Kureha Corporation; Model: KF9200), 0.4 g of a conductive carbon black (purchased from Timcal Ltd; Model: Super P), and 12 g to 15 g of n-methyl-2-pyrrolidone (purchased from Merck Millipore) (hereinafter abbreviated as NMP) were evenly mixed to form a mixture. Thereafter, the mixture was spread on a copper foil having a thickness of 14 μm, followed by drying at 85° C. for 0.5 hours to remove water and NMP, so as to form a conductive layer (having a thickness ranging from 20 μm to 22 μm) on the copper foil, thereby obtaining the anode of Example 1. The conductive layer includes 91 wt % of the anode material, 5 wt % of polyvinylidene difluoride, and 4 wt % of the conductive carbon black based on a total weight of the anode.

The anode thus obtained was used to prepare a CR2032 button cell battery and an 18650 battery as described below.

Preparation of CR2032 Button Cell Battery

The CR2032 button cell battery of Example 1 was made by assembling the anode, a lithium foil serving as a cathode, an electrolytic solution, and a separation film made from polyethylene and polypropylene (purchased from Celgard). The electrolytic solution includes 99 wt % of a 1M lithium hexafluorophosphate (hereinafter abbreviated as $LiPf_6$) solution, and 1 wt % of vinylene carbonate based on a total weight of the electrolytic solution. The $LiPf_6$ solution includes $LiPf_6$, ethylene carbonate (hereinafter abbreviated as EC), ethylene methyl carbonate (hereinafter abbreviated as EMC) and dimethyl carbonate (hereinafter abbreviated as DMC), in a volume ratio of 1:1:1.

Preparation of 18650 Battery

The 18650 battery of Example 1 was made by assembling the above anode, a cathode, and the same electrolytic solution and the separation film used in the CR2032 button cell battery using a winding machine. The cathode includes an aluminum foil serving as a conductive carrier, and a conductive film formed on a surface of the aluminum foil. The conductive film includes 91 wt % of a cathode composition, 5 wt % of an adhesive (polyvinylidene difluoride), and 4 wt % of conductive carbon black (SUPER P™, Timcal). The cathode composition includes lithium manganese oxide ($LiMn_2O_4$) and lithium nickel manganese cobalt oxide ($LiN_{1/3}Co_{1/3}Mn_{1/3}O_2$) in a weight ratio of 30:70.

Example 2

The soft carbon, the anode, the CR2032 button cell battery, and the 18650 battery of Example 2 were made using procedures similar to those of Example 1 except that the coke used in Example 2 was prepared by the following process.

Figure 2:
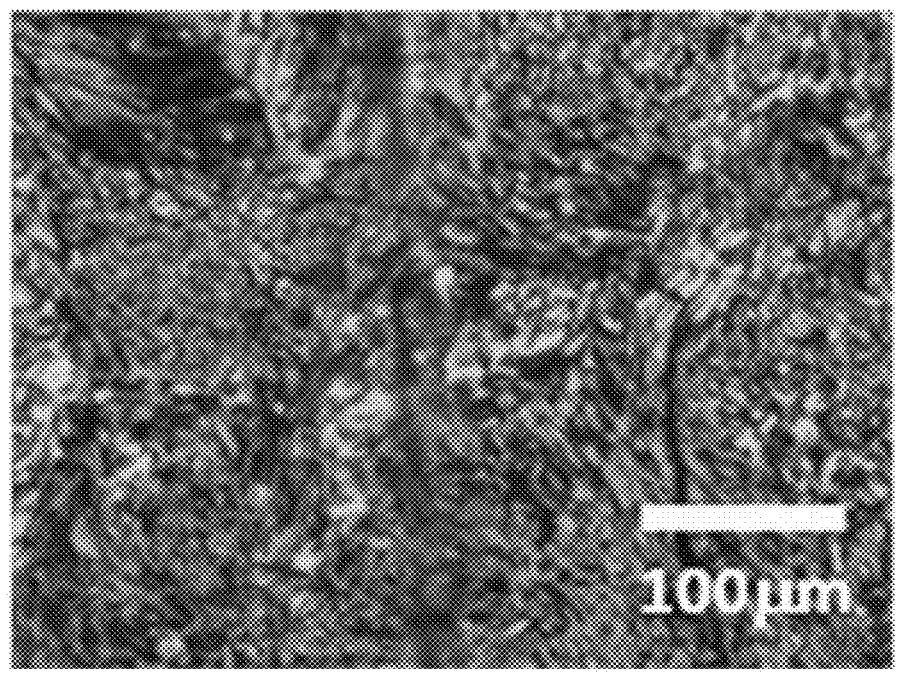
FIG. 2 is a polarizing microscope image of the coke used to prepare the soft carbon of Example 2, in which black regions are crystals in an isotropic phase, and grey regions are crystals having the mesophase structure.

To be specific, the heavy oil was delivered into a heating furnace, and was heated at 500° C. under a pressure of 0.3 MPa for 0.02 hour. During the heating process, water (in an amount ranging from 0.8 wt % to 1.2 wt % of a total weight of the heavy oil) was also delivered into the heating furnace to generate water vapor thereinside. Then, the heated heavy oil was delivered, through a conveyor pipe in the presence of the water vapor, from the heating furnace to a coke chamber at a flow rate of 0.03 m³/s. Thereafter, the heavy oil in the coke chamber was subjected to pyrolysis and polycondensation reactions at a reaction temperature of 490° C. and under a pressure of 0.2 MPa for 24 hours, followed by cooling to room temperature, thereby obtaining the coke. Referring to FIG. 2, the coke used in Example 2 has a mesophase domain size within a range of 1 μm to 30 μm.

Comparative Example 1

The soft carbon, the anode, the CR2032 button cell battery, and the 18650 battery of Comparative Example 1 were made using procedures similar to those of Example 1 except that step b) of the method for making the soft carbon of Comparative Example 1 is different from that of Example 1.

To be specific, the coke used in Comparative Example 1 was only subjected to the main calcination treatment at a temperature of 1000° C. for 4 hours to obtain the soft carbon, followed by grinding and sizing to collect the soft carbon having an average grain size ($D_{50}$) that ranges from 20 μm to 32 μm, which is directly used to prepare the anode of Comparative Example 1.

<Evaluations>

The soft carbons, the CR2032 button cell batteries and the 18650 batteries of Example 1 (EX1), Example 2 (EX2) and Comparative Example 1 (CE1) were subjected to the following tests to evaluate the properties thereof.

1. Grain Size

Figure 3:
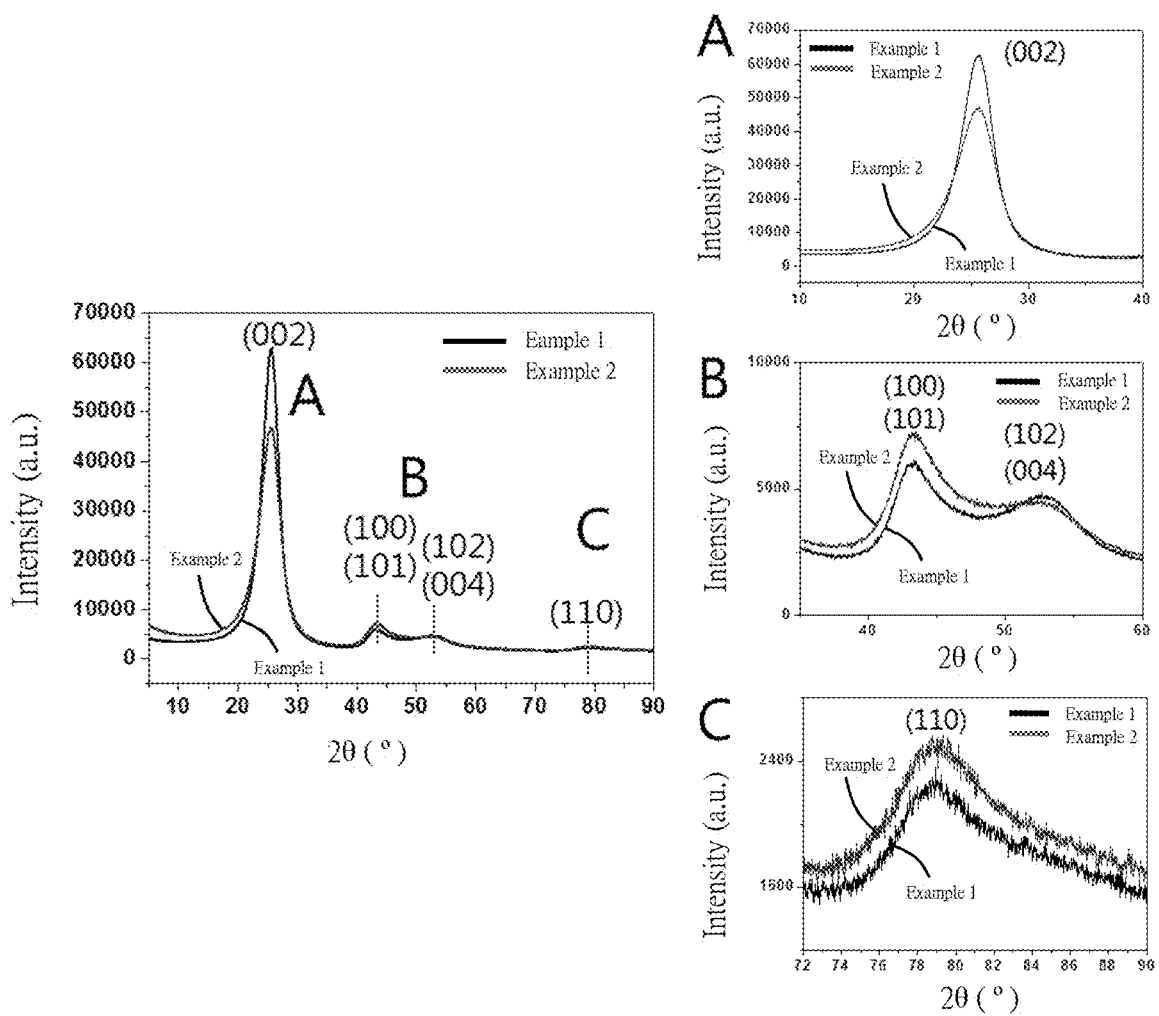
FIG. 3 shows X-Ray Diffraction (XRD) patterns of the soft carbons of Example 1 and Example 2.

The soft carbons of EX1 and EX2 were analyzed with an X-Ray Diffractometer (Manufacturer: Rigaku; Model: Miniflex 300) at a wavelength of 0.154059 nm to obtain X-Ray Diffraction (XRD) patterns thereof (see FIG. 3). The grain size (nm) of each of the soft carbons was then calculated based on the Scherrer equation using a Bragg angle and a full width at half maximum (FWHM) of the peak (three peaks denoted by A, B, C in FIG. 3) in the XRD pattern of a respective one of the soft carbons.

2. Specific Surface Area

The specific surface area (m²/g) of each of the soft carbons was determined using a gas adsorption analyzer (Manufacturer: Micromeritics; Model: TriStar 3000).

3. Tapped Density

The tapped density (g/ml) of each of the soft carbons was measured using a tapped density analyzer (Manufacturer: Quantacrhome; Model: Autotap DAT-3).

4. Percentage of First Cycle Irreversible Capacity Loss (%)

The first cycle charge capacity and first cycle discharge capacity of each of the CR2032 button cell batteries were measured using a battery test equipment (Manufacturer: Arbin Instruments; Model: BT2043) under the following test conditions: a test temperature of 25° C., a C-rate (i.e. a rate at which a battery is charged or discharged) of 0.1 C, an end-of-charge voltage of 0 V and an end-of-discharge voltage of 1.8 V. The percentage of first cycle irreversible capacity loss of each of the CR2032 button cell batteries was then calculated using the following Equation (I):

$$A = [(B-C)/B] \times 100 \qquad (I)$$

where A=the percentage of first cycle irreversible capacity loss (%)

B=the first cycle charge capacity

C=the first cycle discharge capacity (B−C)=the first cycle irreversible capacity loss.

5. Fast-Charging Ability

The fast-charging ability of each of the CR2032 button cell batteries was represented by a capacity retention rate (%) at a C-rate of 0.1 C, 1 C, 2 C, 5 C, or 10 C for one cycle, which was measured using the battery test equipment (Manufacturer: Arbin Instruments; Model: BT2043) at a test temperature of 25° C.

6. Cycle Life Under Fast-Charging

The cycle life under fast-charging of each of the CR2032 button cell batteries was represented by the capacity retention rate at a C-rate of 2 C or 5 C for 100 cycles, which was measured using the battery test equipment (Manufacturer: Arbin Instruments; Model: BT2043) at a test temperature of 25° C.

7. Cycle Life Under Room Temperature

A capacity retention rate of each of the 18650 batteries at a C-rate of 2 C for 2000 cycles was determined using the battery test equipment (Manufacturer: Maccor; Model: Series 4000) at a test temperature of 25° C. The cycle life under room temperature of each of the 18650 batteries was represented by a number of cycles for which the battery has a capacity retention rate of 87%.

8. Cycle Life Under High Temperature

A capacity retention of each of the 18650 batteries at a C-rate of 2 C for 1000 cycles was determined using the battery test equipment (Manufacturer: Maccor; Model: Series 4000) at a test temperature of 45° C. The cycle life under high temperature of each of the 18650 batteries was represented by a number of cycles for which the battery has a capacity retention rate of 82%.

The results of the evaluated properties are shown below in Table 1.

TABLE 1

| | | | EX1 | EX2 | CE1 |
|---|---|---|---|---|---|
| Coke | | Mesophase domain size (μm) | 50-200 | 1-30 | 5-200 |
| Preliminary calcination treatment | | First temperature (° C.) | 850 | 850 | × |
| | | Time period (h) | 4 | 4 | × |
| Main calcination treatment | | Second temperature (° C.) | 1100 | 1100 | 1000 |
| | | Time period (h) | 4 | 4 | 4 |
| Surface-modifying calcination treatment | | Third temperature (° C.) | 1100 | 1100 | × |
| | | Time period (h) | 5 | 5 | × |
| Soft carbon | | Grain size (nm) | 2-5 | 1-<1.5 | × |
| | | Specific surface area (m²/g) | 0.9 | 1.0 | 3-4 |
| | | Tapped density (g/ml) | 0.82 | 0.80 | 0.75 |
| CR2032 button cell battery | | First cycle charge capacity (mAh/g) | 301 | 303 | 357 |
| | | First cycle discharge capacity (mAh/g) | 263 | 262 | 265 |
| | | First cycle irreversible capacity loss (mAh/g) | 38 | 41 | 92 |
| | | Percentage of first cycle irreversible capacity loss (%) | 12.9 | 13.5 | 25.8 |
| | Fast-charging ability | Capacity retention rate at 25° C. for 1 cycle 0.1 C | 100 | 100 | 100 |
| | | 1 C | 91.1 | 88.7 | 87.0 |
| | | 2 C | 86.5 | 84.9 | 83.5 |
| | | 5 C | 81.1 | 77.7 | 73.7 |
| | | 10 C | 74.8 | 69.5 | 65.8 |
| | Cycle life under fast-charging | Capacity retention rate at 25° C. for 100 cycles 2 C | 95.3 | 95.8 | 73.7 |
| | | 5 C | 57.7 | 93.4 | 41.5 |
| 18650 battery | Cycle life under room temperature | Capacity retention rate of 87% at 25° C. and 2 C. cycles | 1150 | 1700 | 900 |
| | Cycle life under room temperature | Capacity retention rate of 82% at 45° C. and 2 C. cycles | 390 | 700 | 250 |

As shown in Table 1, in comparison with CE1, the soft carbon of each of EX1 and EX2 has a reduced specific surface area and a higher tapped density. In addition, the CR2032 button cell batteries of EX1 and EX2 have lower percentages of first cycle irreversible capacity loss, better fast-charging abilities, and longer cycle lives under fast-charging compared to those of CE1. Similarly, the 18650 batteries of EX1 and EX2 have longer cycle lives under room temperature and high temperature as compared to those of CE1. These results indicate that, the soft carbon of this disclosure which was prepared by subjecting the coke to the preliminary calcination treatment followed by the main calcination treatment and the surface-modifying calcination treatment (rather than only the main calcination treatment in CE1) may exhibit better properties, and such soft carbon is capable of being utilized to prepare a battery having an improved performance.

Moreover, when comparing EX1 and EX2, the CR2032 button cell battery of EX1 prepared from the coke having a mesophase domain size within a range of 50 μm to 200 μm is shown to exhibit a better fast-charging ability. By using the coke having a mesophase domain size within a range of 1 μm to 30 μm, the CR2032 button cell battery and 18560 battery of EX2 are shown to have longer cycle lives under different conditions including fast-charging, room temperature, and high temperature.

In sum, by subjecting the coke to multiple carbonization treatments including the preliminary calcination treatment, the main calcination treatment and/or the surface-modifying calcination treatment, the method of this disclosure is capable of making a soft carbon having improved properties (such as reduced specific surface area and increased tapped density), and the resultant soft carbon can be utilized to prepare a battery which may exhibit excellent performance, such as low percentage of irreversible capacity loss, improved fast charging ability, and long cycle life.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for making a soft carbon, comprising the steps of:
    a) providing a coke; and
    b) subjecting the coke to a carbonization process to obtain the soft carbon, the carbonization process sequentially including a preliminary calcination treatment, a main calcination treatment, and a surface-modifying calcination treatment,
    wherein
    the preliminary calcination treatment is conducted by calcining the coke at a first temperature within a range of 800° C. to 1000° C. to obtain a pre-calcinated coke;
    the main calcination treatment is conducted by calcining the pre-calcinated coke at a second temperature that is higher than the first temperature and within a range of 1000° C. to 1200° C. to obtain a main-calcinated coke; and
    the surface-modifying calcination treatment is conducted by calcining the main-calcinated coke in the presence of a pitch at a third temperature that is higher than the first temperature and within a range of 1000° C. to 1200° C. such that after the surface-modifying calcination treatment, the main-calcinated coke is coated with the pitch, thereby obtaining the soft carbon.

2. The method according to claim 1, wherein in step a), the coke has a mesophase domain size ranging from 1 μm to 200 μm.

3. The method according to claim 2, wherein the mesophase domain size of the coke ranges from 1 μm to 30 μm.

4. The method according to claim 2, wherein the mesophase domain size of the coke ranges from 50 μm to 200 μm.

5. The method according to claim 1, wherein in step b), the carbonization process further includes, after the preliminary calcination treatment and before the main calcination treatment, subjecting the pre-calcinated coke to a grinding and sizing treatment.

6. The method according to claim 1, wherein in step b), the preliminary calcination treatment is conducted for 4 hours to 16 hours.

7. The method according to claim 1, wherein in step b), the main calcination treatment is conducted for 4 hours to 20 hours.

8. The method according to claim 1, wherein in step b), the surface-modifying calcination treatment is conducted for 4 hours to 20 hours.

* * * * *